June 26, 1951 H. GARDERE ET AL 2,558,214

OSCILLATION GENERATOR FOR FREQUENCY-MODULATION TRANSMISSION SYSTEMS

Filed Feb. 23, 1949 2 Sheets-Sheet 1

INVENTORS
HENRI GARDERE
SIMON TALMASKY

BY Adams + Bush

ATTORNEYS

INVENTORS
HENRI GARDERE
SIMON TALMASKY
BY Adams & Bush
ATTORNEYS

Patented June 26, 1951

2,558,214

UNITED STATES PATENT OFFICE 2,558,214

OSCILLATION GENERATOR FOR FREQUENCY-MODULATION TRANSMISSION SYSTEMS

Henri Gardère and Simon Talmasky, Paris, France, assignors to Compagnie Industrielle des Telephones, Paris, France, a corporation of France Application February 23, 1949, Serial No. 77,886
In France February 25, 1948

2 Claims. (Cl. 332—23)

This invention comprises an oscillation generator for use in a frequency-modulation transmitting system.

Certain known arrangements of this character use valves of variable slope whose characteristics vary considerably with time and also as a function of the potentials applied to their different electrodes, with possible consequent functional disturbance.

In a generator according to the present invention, on the contrary, a valve of constant mutual conductance is used, thus enabling a law of variation of the frequency of the modulated current as a function of the amplitude of the applied signal to be obtained which is perfectly definite and independent, within wide limits, of the conditions of the current supply to the valve.

The arrangement according to the present invention is characterised in that it comprises an oscillator-valve of constant mutual conductance and that the reaction of the anode circuit on the grid circuit is obtained by two networks in cascade, one of which networks produces a phase displacement variable as a function of frequency while the other produces a variable phase displacement corresponding to the modulating current applied to it.

The first-mentioned network may be a filter or any other phase-shifting device adapted to effect a change of phase for a predetermined range of frequency change.

The second-mentioned network is a modulator adapted to produce an output voltage which varies in phase with reference to the input voltage as a function of the magnitude of the modulating current applied to the control terminals.

Figure 1:
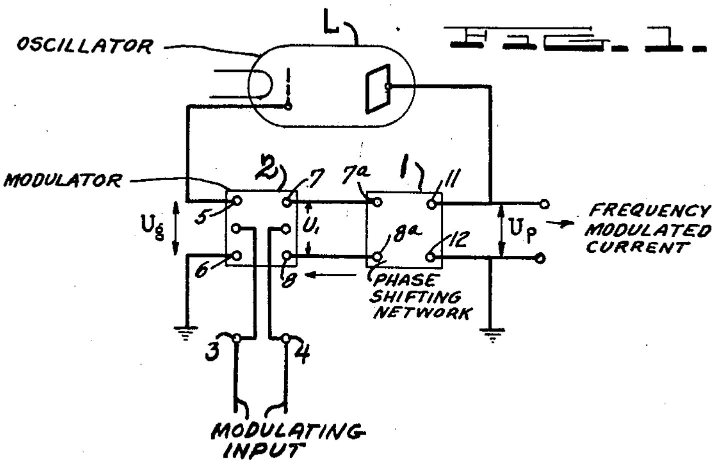
Figure 2:
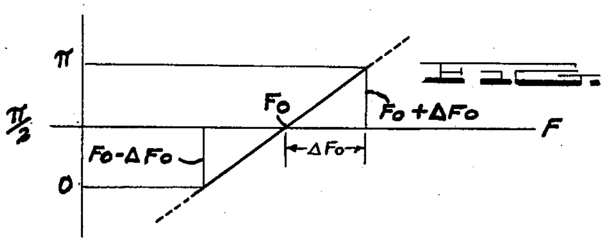
Figure 3:
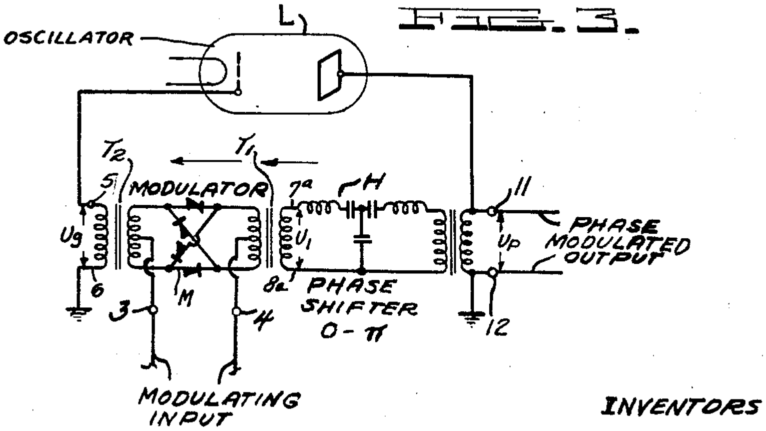
Figure 4A:
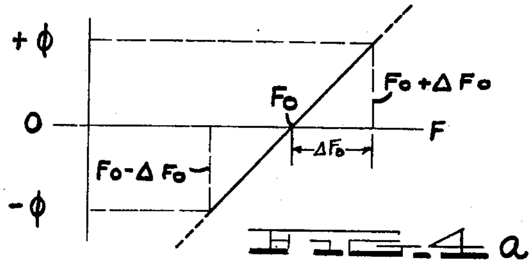
Figure 4B:
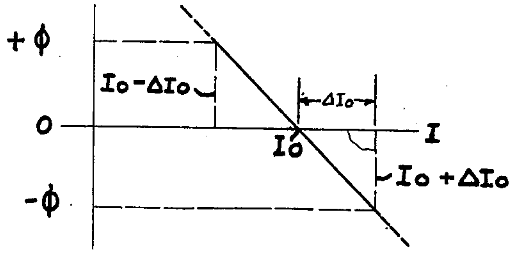
Figure 5:
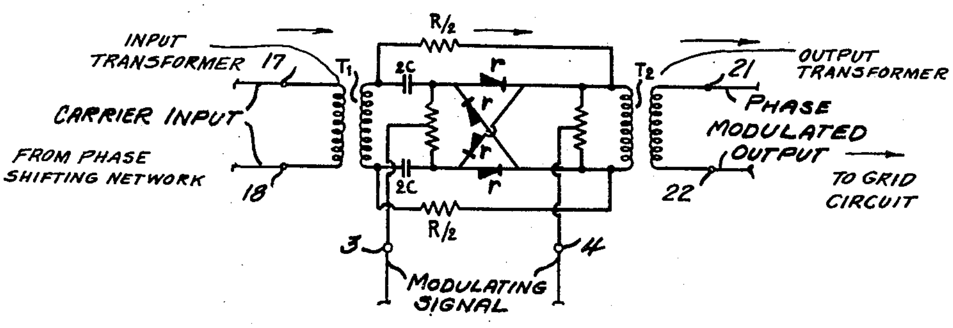

A number of different forms of the present invention will now be described by way of example with reference to the accompanying drawings in which:

Figure 1 is a circuit diagram illustrating the principle of an oscillation generator according to the present invention, Figure 2 is a diagram illustrating its operation, Figure 3 is a more detailed circuit diagram of one form of circuit arrangement according to the present invention, Figures 4*a* and 4*b* are phase-variation diagrams, illustrating the operation of another form of circuit arrangement embodying the modulator shown in Fig. 5, and Figure 5 is a diagram of a modified modulator.

In Figure 1, L represents the oscillator tube, 1 represents the first network adapted to produce a phase variation as a function of frequency and

2 represents the second network or modulator. The modulator has control terminals 3 and 4 to which the modulating signal wave is applied. $U_p$ indicates the voltage in the anode circuit of the tube and $U_g$ indicates the output voltage of the modulator, which is applied to the grid of the valve.

Figure 2 shows how the difference of phase between the input and output voltages of the network 1 varies as to function of frequency over a range of frequency $\pm\Delta F_0$ above and below a mean frequency $F_0$.

The action of this arrangement may be explained as follows with reference to Fig. 3.

To maintain the oscillations, the voltages in the anode and grid circuits of the tube must be in phase opposition.

Thus, when the polarity of the modulating current is such that the output voltage $U_g$ of the modulator is in phase opposition to the input voltage $U_1$, there is no phase displacement in the network H (network 1 of Fig. 1) and the system therefore oscillates at the frequency $F_0-\Delta F_0$.

If now, the modulating signal current is reversed in polarity, the voltages $U_g$ and $U_1$ are brought into phase and the network 1 must produce a phase displacement of $\pi$ radians to re-establish the oscillations. The system therefore oscillates at the frequency $F_0+\Delta F_0$.

As shown in Figure 3, the network 1 of Figure 1 consists of a filter H in which the current transmitted undergoes a phase shift variable from 0 to $\pi$ radians according to the frequency of the current. As shown, H is a T-connected band pass filter. The modulating voltage is applied to the control terminals 3 and 4 of a modulator M and the output voltage of the oscillation generator is obtained at the terminals 11 and 12.

In a modified arrangement the network 1 of Fig. 1, instead of producing a phase shift of from 0 to $\pi$ radians over the frequency range $F_0-\Delta F_0$ to $F_0+\Delta F_0$, produces a phase shift of from $-\varphi$ to $+\varphi$ over the same range of frequencies, so that zero phase shift corresponds to the middle of the frequency range, that is, to the frequency $F_0$.

In this modified arrangement, the modulator is constructed so that its output has a phase displacement relatively to its input which is proportional to the instantaneous voltage of the modulating wave and varies between $-\varphi$ and $+\varphi$ during a complete cycle of the modulating wave.

Figure 4*a* shows the variation with frequency of the phase shift due to the network 1 in this modified arrangement, and Figure 4*b* shows the variation of the phase shift due to the modulator as a function of the instantaneous value of the modulating current.

The action of this modified arrangement may be explained as follows:

The voltage $Ug$ (Figure 1) applied to the grid circuit of the oscillator tube L is displaced in phase relatively to the voltage $Up$ in the anode circuit by a phase angle equal to the sum of the phase displacements due to the networks 1 and 2 respectively.

Now, the phase shift due to the network 1, which depends on the variation of frequency, is equal and opposite in sign to that due to the network 2, which depends on the instantaneous value of the modulating current. The sum of these phase shifts is thus zero for every value of the modulating current. To bring the over-all phase shift to the value $\pi$ radians, which is necessary to maintain the oscillations, it is only necessary to connect the input terminals of the network 1 in the appropriate sense. The oscillations thus obtained vary in frequency so that the frequency changes are proportional to the amplitude of the modulating current. In other words, as the modulating current passes through all the intermediate values between the limits $I_0-\Delta I_0$ and $I_0+\Delta I_0$, the frequency varies through corresponding intermediate values between $F_0-\Delta F_0$ and $F_0+\Delta F_0$.

Figure 5 shows one example of a form of modulator adapted to obtain this result.

It is a ring modulator comprising four rectifying elements arranged in a bridge and having input and output transformers $T_1$ and $T_2$ (Fig. 5). Two condensers of equal capacity 2C are connected in series between the rectifying elements and the ends of the secondary winding of the transformer $T_1$. Two resistances each having the value $$\frac{R}{2}$$

are arranged as shown so that they connect the ends of the secondary winding of the transformer $T_1$ to the corresponding ends of the primary winding of the transformer $T_2$.

The carrier-wave current fed to the input terminals 17 and 18 is thus divided into two parts, one part passing directly through the resistances $R/2$ without being modulated, while the other part passes through the condensers 2C and is modulated under the control of the modulating voltage applied to the terminals 3 and 4.

Let $E \sin \Omega t$ be the input voltage and let $E' \sin \omega t$ be the modulating voltage. If R is sufficiently large relatively to the input and output impedances connected across the terminals 17 and 18 and the terminals 21 and 22 respectively, the current flowing through the resistances $R/2$ is equal to $$\frac{E}{R} \sin \Omega t$$

whilst the current that flows through the condensers 2C is equal to $EC\Omega \cos \Omega t$, and the modulation by $E' \sin \omega t$ produces a current of the form $EE'C\Omega \cos \Omega t \sin \omega t$. The capacity of the condenser is so chosen that the current is smaller than the current that flows through the resistance $$\frac{R}{2}$$

The current I obtained at the terminals 21 and 22 is the sum of the two currents mentioned above, that is:

$$I=\frac{E}{R} \sin \Omega t+EE'C\Omega \sin \omega t \cos \Omega t=$$

$$\sqrt{\frac{E^2}{R^2}+E^2E'^2C^2\Omega^2 \sin^2 \omega t}\ \sin (\Omega t+\operatorname{arctg} E'RC\Omega \sin \omega t)$$

The values of C and R are chosen so that $ER'C\Omega$ is small compared with $$\frac{E}{R}$$

so that the following is obtained:

$$I=\frac{E}{R} \sin (\Omega t+E'RC\Omega \sin \omega t)$$

This represents a phase-modulated current.

What we claim is:

1. In an oscillation generator for a frequency modulation transmission system, an oscillator tube having a substantially constant mutual conductance, said tube having a grid circuit and an anode circuit, a T-connected band pass filter unit having its input terminals connected in said anode circuit, a ring modulator unit having input terminals, control terminals and output terminals, the input terminals of said ring modulator unit being connected to the output terminals of said band pass filter unit, a source of signal current connected to the control terminals of said ring modulator unit, the output terminals of said ring modulator unit being connected in the grid circuit of said tube, and output means to collect the resultant current in the anode circuit of said tube.

2. In an oscillation generator for a frequency modulation transmission system, an oscillator tube having a substantially constant mutual conductance, said tube having a grid circuit and an anode circuit, a T-connected band pass filter unit having its input terminals connected in said anode circuit, a ring modulator unit having input terminals, control terminals and output terminals, the input terminals of said ring modulator unit being connected to the output terminals of said band pass filter unit, a source of signal current connected to the control terminals of said ring modulator unit, the output terminals of said ring modulator unit being connected in the grid circuit of said tube, and output means to collect the resultant current in the anode circuit of said tube, said ring modulator unit comprising a bridge arrangement of rectifier elements having input terminals and output terminals, two input signal resistances connected respectively in parallel between the input terminals and the output terminals of said bridge arrangement, the said source of signal current being connected between the mid-points of said two input signal resistances, a pair of coupling condensers, an input transformer having a secondary winding connected serially through said coupling condensers to the input pair of terminals of said bridge arrangement, a grid transformer interposed between the output terminals of said ring modulator unit and the grid circuit of said tube and having its primary winding connected directly to the output pair of terminals of said bridge arrangement, and two coupling resistances of substantially equal resistance, one of said coupling resistances being connected between one terminal of the secondary winding of said input transformer and one terminal of the primary winding of said grid transformer, and the other said coupling resistance being connected between the other terminal of the secondary winding of the input transformer and the other terminal of the primary winding of said grid transformer.

HENRI GARDÈRE.
SIMON TALMASKY.

REFERENCES CITED

The following references are of record in the file of this patent:

UNITED STATES PATENTS

| Number | Name | Date |
|---|---|---|
| 2,321,269 | Artzt | June 8, 1943 |